United States Patent Office 3,560,410

Patented Feb. 2, 1971

3,560,410

RESISTOR COMPOSITIONS CONTAINING PYROCHLORE-RELATED OXIDES AND CADMIUM OXIDE

Kenneth E. Schubert, Wilmington, Del., assignor to E. I. du Pont de Nemours and Company, Wilmington, Del., a corporation of Delaware No Drawing. Continuation-in-part of application Ser. No. 803,434, Feb. 28, 1969. This application Nov. 28, 1969, Ser. No. 880,941

Int. Cl. H01b *1/06*

U.S. Cl. 252—518 10 Claims

ABSTRACT OF THE DISCLOSURE

Resistor compositions, which yield, upon firing, smooth resistors having a wide range of resistances, low TCR's and good stability properties, comprising (1) an oxide of the formula $$(M_xBi_{2-x})(M'_yRu_{2-y})O_{7-z}$$

wherein

M is at least one metal selected from the group consisting of yttrium, lanthanum, thallium, indium, cadmium, lead and the rare earth metals of atomic number 58–71 inclusive, M′ is at least one metal selected from the group consisting of platinum, titanium, tin, chromium, rhodium, iridium, rhenium, zirconium, antimony and germanium, (2) an inorganic binder, and (3) a required amount of cadmium oxide or of a cadmium oxide precursor. The control over properties afforded by this combination of ingredients and proportions thereof enhances the significance of this invention.

CROSS-REFERENCE TO RELATED APPLICATIONS

This is a continuation-in-part of U.S. patent application S.N. 803,434, filed Feb. 28, 1969.

BACKGROUND OF THE INVENTION

Precious resistor compositions containing an inorganic binder have become highly desirable for use in the production of fired electrical resistors. Such resistor compositions and resistors prepared therefrom are, for example, shown in D'Andrea U.S. Pat. 2,924,540 and Dumesnil U.S. Pat. 3,052,573.

Electrical resistors made with these and other prior art compositions possess one or more of the following undesirable properties: high temperature coefficients of resistance, rough surface characteristics, high noise character, a high percentage of drift and poor moisture resistance.

Temperature coefficient of resistance (TCR), generally expressed in parts per million per degree centigrade, is an important characteristic of resistors since changes in temperature will create relatively large changes in resistance when the TCR is high. TCR is generally measured by measuring:

(1) Resistance at room temperature
(2) Resistance at −75° C.
(3) Resistance at 125° C.

Great care is taken to achieve thermal equilibrium at each temperature. The change in resistance is expressed as a function of the room temperature resistance, divided by the temperature increment to give the coefficient.

All of the other above-mentioned properties detract from the overall usefulness of resistors in the electronic field today. Naturally, the elimination of these undesirable properties will conversely produce resistors with highly desirable properties.

Thus, there is a continuing need for resistor compositions which can be fired to produce resistors which do not possess the above-mentioned undesirable properties. In particular, smooth resistors having low TCR's and controllable resistivities are of great importance in the electronic industry today.

SUMMARY OF THE INVENTION

This invention relates to resistor compositions comprising (1) 5–90% by weight of an oxide of the formula $$(M_xBi_{2-x})(M'_yRu_{2-y})O_{7-z}$$

wherein

M is at least one metal selected from the group consisting of yttrium, lanthanum, thallium, indium, cadmium, lead and the rare earth metals of atomic number 58–71 inclusive, M′ is an ion of a metal selected from the group consisting of platinum, titanium, tin, chromium, rhodium, iridium, rhenium, zirconium, antimony and germanium,

*x* is a number in the range 0–2,
*y* is a number in the range 0–2, and
*z* is a number in the range 0–1, being at least equal to about *x*/2 when M is a divalent metal, (2) 10–90% by weight of a finely divided inorganic binder and (3) up to 10% by weight of cadmium oxide, or a cadmium oxide precursor capable of yielding up to 10% by weight of cadmium oxide when fired in the presence of said inorganic binder.

Moreover, such resistor compositions may be dispersed in a liquid vehicle, preferably inert, to provide a resistor paint or paste that can be applied to a surface of a ceramic substrate and fired to form a stable resistor.

DESCRIPTION OF THE PREFERRED EMBODIMENTS

The preferred resistor compositions of this invention comprise 5–50% by weight of $Bi_2Ru_2O_7$, 30–75% by weight of a finely divided inorganic binder, and up to 5% by weight of CdO or an equivalent amount of cadmium oxide as a CdO precursor or CdO glass.

The essence of this invention lies in the inclusion of a pyrochlore-related oxide and CdO (or a precursor thereof) in the resistor compositions and the proportions of pyrochlore-related oxide, CdO and inorganic binder in the resistor compositions. The ternary bismuth ruthenium oxides, which are disclosed and claimed in Bouchard S.N. 692,108, filed Dec. 20, 1967, are incorporated by reference into this specification. The oxides which come within the scope of S.N. 692,108 are included in the resistor compositions of this invention. In general, oxides of the formula $(M_xBi_{2-x})(M'_yRu_{2-y})O_{7-z}$, where M is at least one metal from the group of yttrium, lanthanum, thallium, indium, cadmium, lead or rare earth metal ion of atomic number 58–71 inclusive, M′ is at least one metal from the group of Pt, Ti, Sn, Cr, Rh, Ir, Re, Zr, Sb and Ge, *x* is 0–2, *y* is 0–2, and *z* is 0–1, being at least equal to about *x*/2 when M is a divalent metal, are operable for purposes of this invention. It is pointed out that the term "an oxide" designates pyrochlore-related oxide(s), including multi-substituted oxides (e.g., $NdBiRu_2O_7$, $CdPbRu_2O_6$, $CdPbReO_7$) as well as mixtures of said oxides (substituted or unsubstituted). Outstanding among these oxides is $Bi_2Ru_2O_7$; it is electrically conductive with a low resistivity that is substantially independent of temperature over a wide temperature range. $Bi_2Ru_2O_7$ is also stable on heating in air to at least 1000° C., and its properties are not adversely affected by mild reducing conditions. Consequently, when resistor compositions comprising $Bi_2Ru_2O_7$ and glass binder are fired under conventional conditions, the $Bi_2Ru_2O_7$ is essentially unaffected, does not dissociate and remains as an integral part of the fired resistor.

The proportions of the various components are critical and must conform with the prescribed limits. Generally, the resistor compositions must comprise from 5–90% of a pyrochlore-related oxide, 10–90% inorganic binder, and up to 10% of cadmium oxide. The weight ratios of these components to each other have a significant effect on the resistance and the temperature coefficient of resistance; but in addition, they also have an effect on the smoothness of the fired resistors, moisture stability, noise level and drift. When less than 5% by weight of a pyrochlore-related oxide is used, the ultimate fired resistors have erratic and unreproducible electrical properties. If more than 90% by weight of the oxide is used, the bonding properties of the resistor composition are significantly affected. In most instances, there is insufficient bonding of the resistor composition to the substrate when more than 90% of a pyrochlore-related oxide is present in the resistor composition.

The TCR is greatly affected by the amount of cadmium oxide. When no cadmium oxide is present, the TCR's of the fired resistors become high and/or positive at certain resistance levels; this is a commercially undesirable situation. Additionally, some cadmium oxide is needed to produce fired resistors which possess the following combination of useful properties: a wide range of resistances, low TCR's, moisture stability, low noise level and low drift. Consequently, it is very important that some cadmium oxide up to 10% be present. Of course, the amount of inorganic binder also has an effect on the TCR's but not as significantly as does the cadmium oxide.

It is pointed out that "cadmium oxide" as used throughout the specification includes CdO, a glass containing CdO, and any cadmium oxide precursor capable of yielding up to 10% by weight of cadmium oxide. Examples of suitable cadmium oxide precursors are compounds such as $CdCO_3$, $Cd(NO_3)_2$, crystalline cadmium silicate and vitreous compositions such as cadmium borate, cadmium silicate and cadmium borosilicate glasses.

The resistivity is mainly affected by the amount of inorganic binder present in the resistor compositions. At least 10% by weight inorganic binder must be present to produce the desired resistances in the fired resistors. On the other hand, the use of more than 90% binder produces a wide range of resistances which are too high and erratic for electronic applications.

In addition to the above-mentioned specific effects which each component has on the resistor composition and the fired resistor, each of the components exerts an overall effect on all of the desirable properties. For example, the pyrochlore-related oxides, being conductive oxides, also contribute to the conductivity, and conversely, to the resistivity of the resistors. The type and amount of inorganic binder affects the TCR range. The CdO, in addition to lowering the TCR, raises the resistance. Therefore, each of the individual components and their overall proportions must be considered together as affecting the properties of the resistor compositions and fired resistors made therefrom. The preferred proportions comprise 5–50% by weight of a ternary bismuth ruthenium oxide, 30–75% by weight of inorganic binder, and up to 5% by weight of cadmium oxide.

Other factors which affect the properties of the fired resistor compositions include the particle size and firing temperature. Generally speaking, the finer the oxides (pyrochlore-related and CdO), the lower the resistance; the TCR is also lowered as the oxides become finer. As to the firing temperature, higher firing temperatures tend to produce resistors which are less affected by humidity, but any conventional firing temperatures may be used. An optimum firing temperature for $Bi_2Ru_2O_7$ resistor compositions is within the range of 825° C.–925° C.

Any inorganic material which serves to bind the pyrochlore-related oxide to the substrate can be used as the inorganic component. The inorganic binder can be any of the glass frits employed in resistor compositions for this general type. Such frits are generally prepared by melting a glass batch composed of the desired metal oxides, or compounds which will produce the glass during melting, and pouring the melt into water. The coarse frit is then milled to a powder of the desired fineness. The patents to Larsen and Short, U.S. Pat. 2,822,279 and to Hoffman, U.S. Pat. 3,207,706, describe some frit compositions which can be employed either alone or in combination with glass wetting agents such as bismuth oxide. Typical frit compositions usable as binders in the compositions of this invention include borosilicate glasses such as lead borosilicate. Other desirable frits which contribute to low TCR's and low drift are disclosed in U.S. Pat. 3,207,706. If a cadmium glass is used as the inorganic binder, the amount of cadmium present in the glass must be calculated and considered to be part of the actual CdO content. Usually, the glass binder should comprise a glass which does not contain cadmium. When the inorganic binder consists solely of a Cd glass, the TCR's tend to be very negative.

The resistor compositions of the invention will usually, although not necessarily, be dispersed in an insert vehicle to form a paint or paste for application to various substrates. The proportion of vehicle to resistor composition may vary considerably depending upon the manner in which the paint or paste is to be applied and the kind of vehicle used. Generally, from 1–20 parts by weight of resistor composition (oxides and inorganic binder) per part by weight of vehicle will be used to produce a paint or paste of the desired consistency. Preferably, 3–10 parts per part of vehicle will be used.

Any liquid, preferably inert, may be employed as the vehicle. Water or any one of various organic liquids, with or without thickening and/or stabilizing agents, and/or other common additives, may be utilized as the vehicle. Examples of organic liquids that can be used are the higher alcohols; esters of such alcohols, for example, the acetates and propionates; the terpenes such as pine oil, alpha- and beta-terpineol and the like; and solutions of resins such as the polymethacrylates of lower alcohols, or solutions of ethyl cellulose, in solvents such as pine oil and the monobutyl ether of ethylene glycol monoacetate (butyl-O—$CH_2CH_2$—$OOCH_3$). The vehicle may contain or be composed of volatile liquids to promote fast setting after application; or it may contain waxes, thermoplastic resins or the like materials which are thermofluid so that the vehicle-containing composition may be applied at an elevated temperature to a relatively cold ceramic body upon which the composition sets immediately.

The resistor compositions are conventionally made by admixing the components in their respective proportions. additionally, one part of vehicle for every 1–20 parts of solids mentioned above may be admixed. Then the resistor composition is applied to a ceramic body and fired to form a stable resistor.

Application of the resistor composition in paint or paste form to the substrate may be effected in any desired manner. It will generally be desired, however, to effect the application in precise pattern form, which can be readily done in applying well-known screen stencil techniques or methods. The resulting print or pattern will then be fired in the usual manner at a temperature from about 825° C.–925° C. in an air atmosphere embodying the usual firing furnace.

The invention is illustrated by the following examples. In the examples and elsewhere in the specification, all parts, ratios and percentages of materials or components are by weight.

Various resistor compositions were prepared employing a pyrochlore-related oxide, inorganic binder, and a cadmium glass as the source of CdO, in finely divided form and varying proportions. The particle sizes of these components ranged from 0.1–20 microns, which are sufficiently finely divided to pass through a 325 mesh (U.S. Standard Sieve Scale) stencil screen. All were suspended in an inert vehicle consisting of 8% ethyl cellulose and 92% beta-terpineol. The inorganic binder was a glass powder consisting of 63% PbO, 26% $SiO_2$, 10% $B_2O_3$ and 1% $Al_2O_3$, and the Cd glass consisted of 78% CdO, 9% $B_2O_3$, 9% $SiO_2$, and 4% $Al_2O_3$. The weight ratio of solid resistor composition to vehicle was 4:1 to insure paints having a preferred consistency. The paints were screen printed onto a 96% dense alumina substrate, onto which palladium-silver alloy patterns had been fired to provide electrical contacts. The substrate with the screen printed composition thereon was heated to 100° C. and to 850° C. (fired) for approximately 10-minute periods at peak firing. Adherent resistor layers approximately 0.8 mil thick were formed. The resistor compositions prepared in this way and fired as described above, along with their properties, are described below in Table I.

TABLE I

| Example No. | 1 | 2 | 3 | 4 | 5 | 6 | 7 | 8 |
|---|---|---|---|---|---|---|---|---|
| $Bi_2Ru_2O_7$ (wt. percent) | 42.88 | 35.72 | 34.05 | 30.70 | 27.35 | 25.68 | 20.65 | 20.64 |
| Glass (wt. percent) | 56.08 | 62.92 | 64.49 | 67.65 | 70.81 | 72.38 | 77.12 | 75.84 |
| CdO (wt. percent) | 1.04 | 1.36 | 1.46 | 1.65 | 1.84 | 1.94 | 2.23 | 3.51 |
| Resistivity (ohms/square) | 790 | 6.4K | 10K | 19.2K | 44.6K | 56.5K | 225K | 245K |
| TCR 25 to 125° (p.p.m./° C.) | 67 | 32 | 7 | 13 | −1 | 5 | −67 | −50 |
| TCR 25 to −75° C. | −48 | −100 | −132 | −113 | −134 | −125 | −221 | −202 |
| Smoothness (± inches roughness) | 10 | 5 | 5 | 5 | 5 | 5 | 5 | 5 |

It can be seen from the tabulated data that a proper balance must be maintained among the various components so as to obtain the desired resistance and temperature coefficient of resistance. Particular significance is attached to the fact that suitable resistor compositions can be tailor-made to have various resistances, temperature coefficients of resistance, smoothness and good stability properties which meet the needs of those skilled in the art by varying the proportions of ingredients within the prescribed limits of this invention.

I claim:

1. A resistor composition comprising (1) 5–90% by weight of an oxide of the formula $$M_xBi_{2-x})(M'_yRu_{2-y})O_{7-x}$$

wherein

M is at least one metal selected from the group consisting of yttrium, lanthanum, thallium, indium, cadmium, lead and the rare earth metals of atomic number 58–71 inclusive, M′ is an ion of a metal selected from the group consisting of platinum, titanium, tin, chromium, rhodium, iridium, rhenium, zirconium, antimony, and germanium, $x$ is a number in the range 0–2, $y$ is a number in the range 0–2, and $z$ is a number in the range 0–1, being at least equal to about $x/2$ when M is a divalent metal, (2) 10–90% by weight of a finely divided inorganic binder, and (3) up to 10% by weight of cadmium oxide, or a cadmium oxide precursor capable of yielding up to 10% by weight of cadmium oxide when fired in the presence of said inorganic binder.

2. A resistor composition in accordance with claim 1 which is dispersed in an inert vehicle, said composition being present in an amount of from 1–20 parts by weight per part by weight of inert vehicle.

3. A resistor composition in accordance with claim 1 wherein said (1) oxide is $Bi_2Ru_2O_7$.

4. A resistor composition in accordance with claim 1 wherein said cadmium oxide percursor is a cadmium oxide glass.

5. A resistor composition comprising 5–50% by weight of $Bi_2Ru_2O_7$, 30–75% by weight of finely divided inorganic binder and up to 5% by weight of CdO or a cadmium oxide precursor capable of yielding up to 5% by weight of cadmium oxide when fired in the presence of said inorganic binder.

6. A resistor composition in accordance with claim 5 which is dispersed in an inert vehicle, said composition being present in an amount of from 1–20 parts by weight per part by weight of inert vehicle.

7. A method of preparing an electrical resistance element comprising applying the resistor composition of claim 2 onto an electrically nonconductive substrate and firing the substrate to a temperature within the range of 825–925° C.

8. An electrical resistance element comprising an electrically nonconductive substrate having fired thereon the resistor composition of claim 1.

9. An electrical resistance element comprising an electrically nonconductive substrate having fired thereon the resistor composition of claim 3.

10. An electrical resistance element comprising an electrically nonconductive substrate having fired thereon the resistor composition of claim 5.

References Cited

UNITED STATES PATENTS

| | | | |
|---|---|---|---|
| 2,477,649 | 8/1949 | Pincus | 106—47 |
| 2,859,163 | 11/1958 | Ploetz et al. | 106—47 |
| 3,379,942 | 4/1968 | Davis | 106—47 |

DOUGLAS J. DRUMMOND, Primary Examiner

U.S. Cl. X.R.

117—201

PO-1050
(5/69)

UNITED STATES PATENT OFFICE
CERTIFICATE OF CORRECTION

Patent No. 3,560,410 Dated February 2, 1971

Inventor(s) Kenneth E. Schubert

It is certified that error appears in the above-identified patent and that said Letters Patent are hereby corrected as shown below:

In column 4, line 67, change "embodying" to -- employing --.
In column 5, line 43, change "$M_xBi_{2-x}$) ($M'_yRu_{2-y}$)$O_{7-x}$" to -- ($M_xBi_{2-x}$) ($M'_yRu_{2-y}$)$O_{7-z}$ --.

Signed and sealed this 11th day of May 1971.

(SEAL)
Attest:

EDWARD M.FLETCHER,JR.
Attesting Officer

WILLIAM E. SCHUYLER, JR
Commissioner of Patents